J. E. MUHLFELD & H. F. BALL.
WHEELED SUPPORT FOR RAILROAD VEHICLES.
APPLICATION FILED APR. 28, 1915.
1,191,136.
Patented July 11, 1916.
5 SHEETS—SHEET 2.
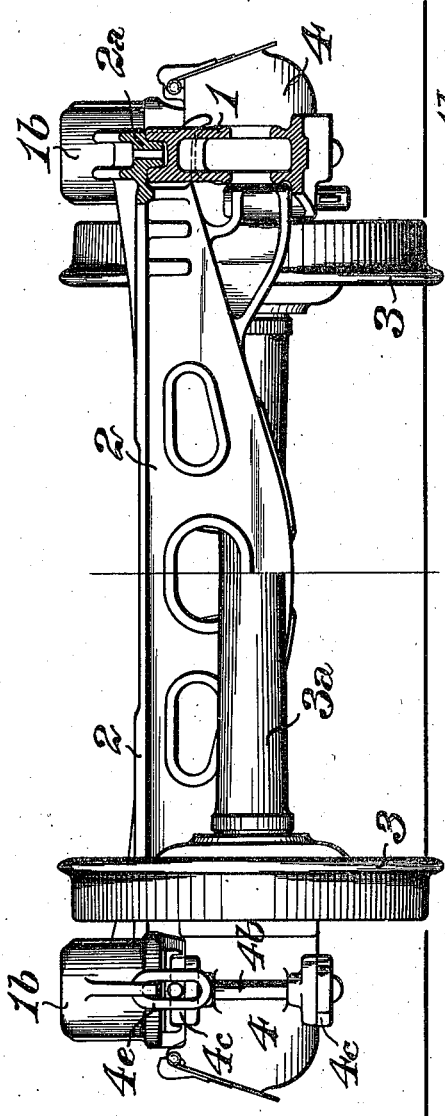
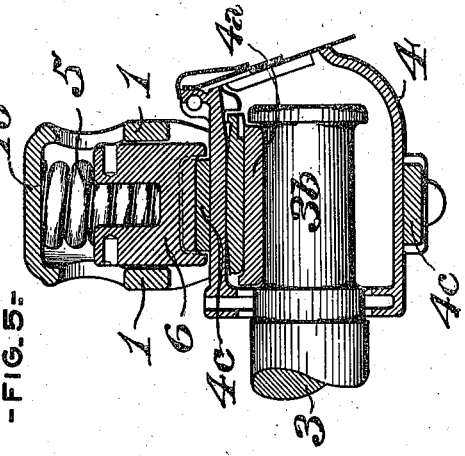
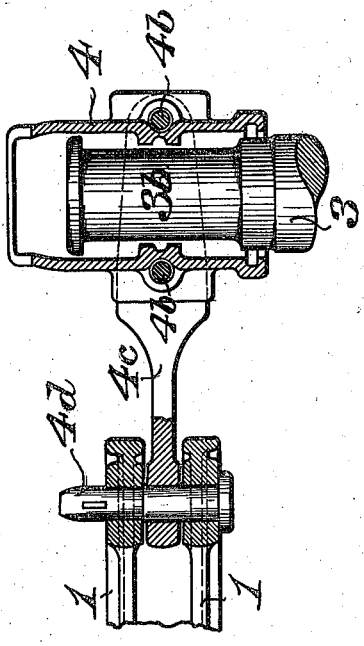
WITNESSES
INVENTORS J. E. MUHLFELD & H. F. BALL.
WHEELED SUPPORT FOR RAILROAD VEHICLES.
APPLICATION FILED APR. 28, 1915.
1,191,136.
Patented July 11, 1916.
5 SHEETS—SHEET 3.
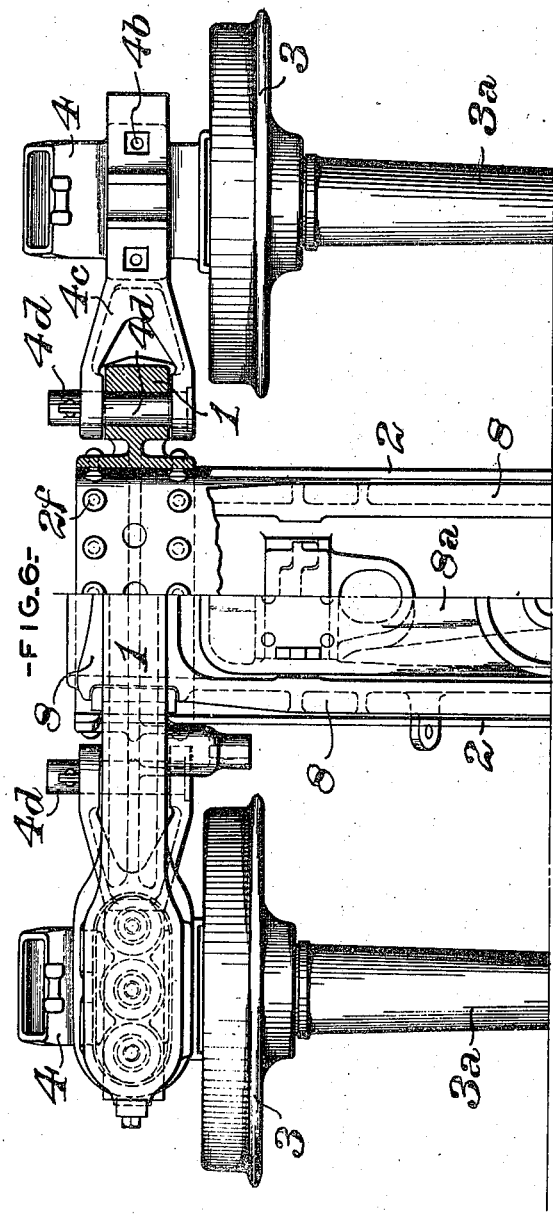
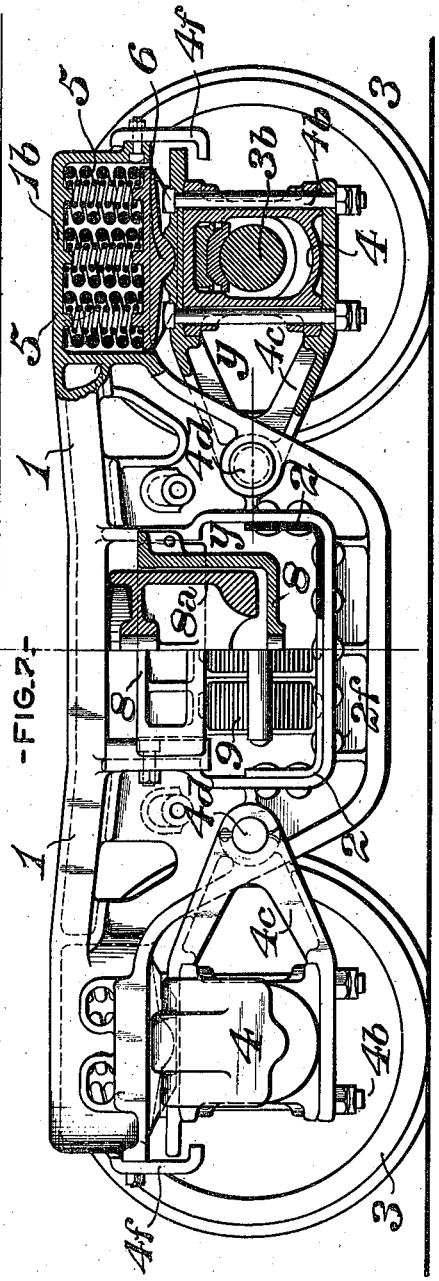

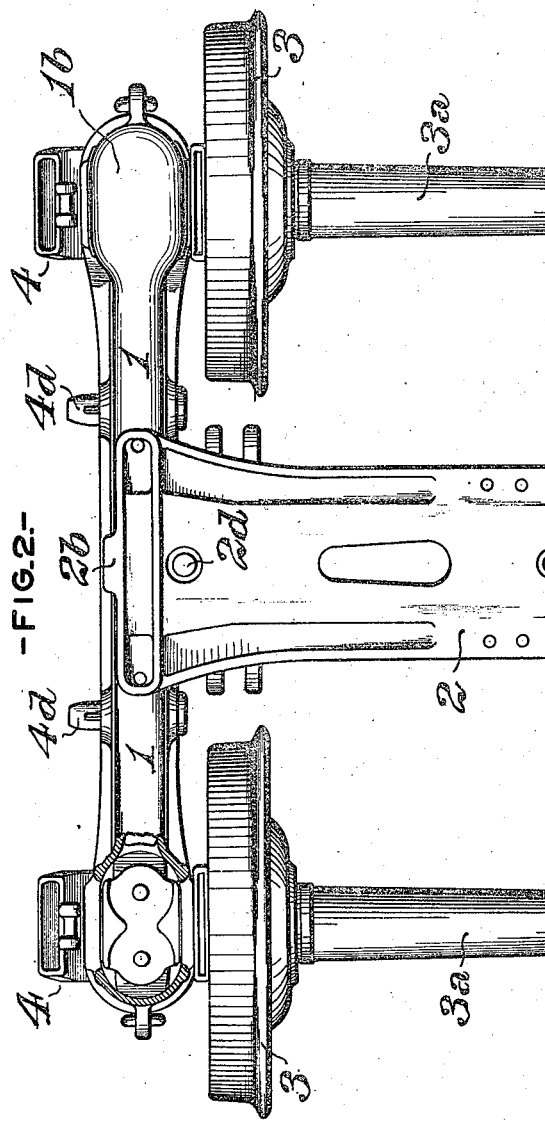
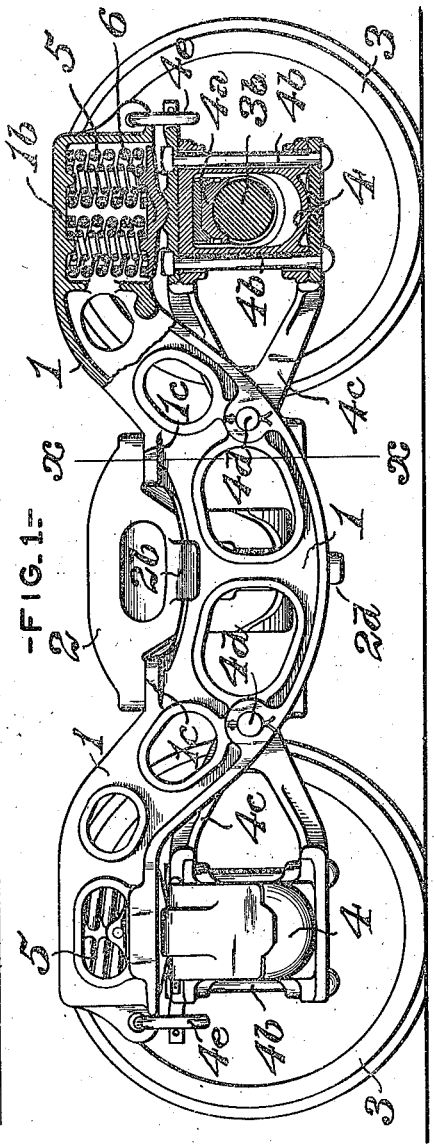

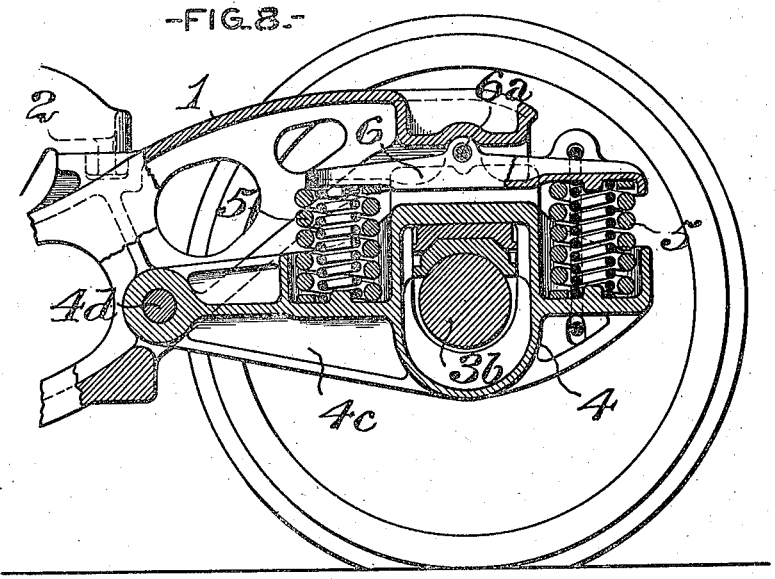
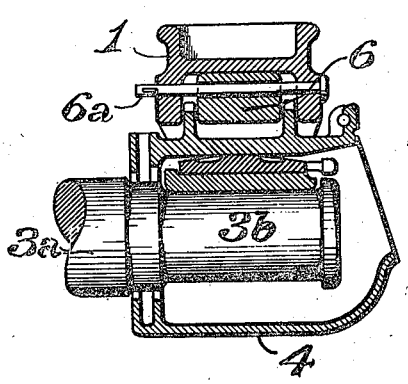
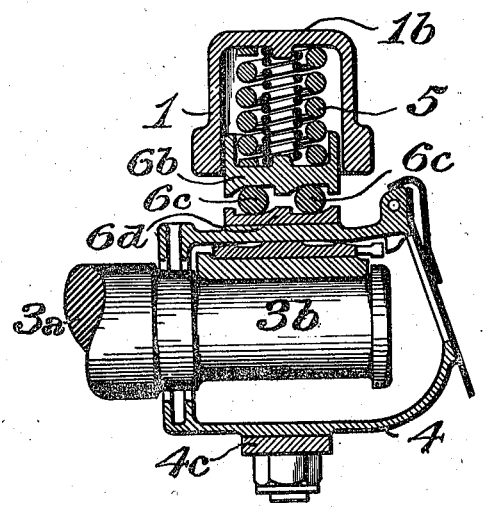

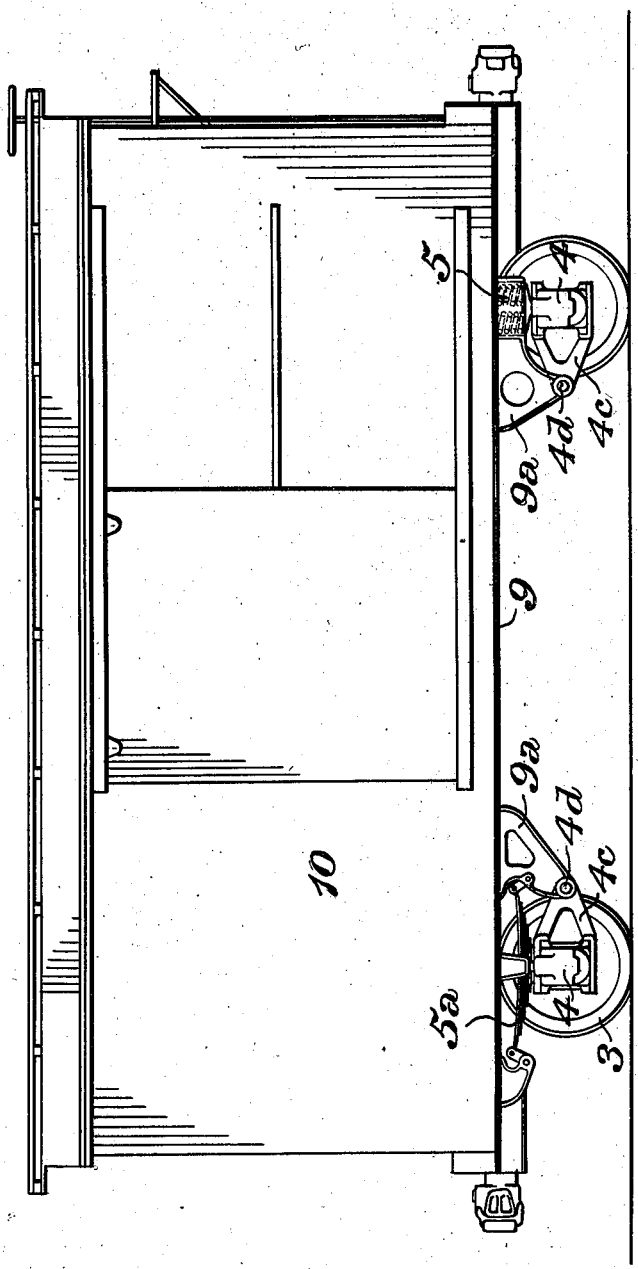

UNITED STATES PATENT OFFICE.

JOHN E. MUHLFELD, OF SCARSDALE, AND HERMAN F. BALL, OF NEW YORK, N. Y.

WHEELED SUPPORT FOR RAILROAD-VEHICLES.

1,191,136.      Specification of Letters Patent.     Patented July 11, 1916.

Application filed April 28, 1915. Serial No. 24,496.

*To all whom it may concern:*

Be it known that we, JOHN E. MUHLFELD, of Scarsdale, in the county of Westchester and State of New York, and HERMAN F. BALL, of the borough of Manhattan, in the city, county, and State of New York, have jointly invented a certain new and useful Improvement in Wheeled Supports for Railroad-Vehicles, of which improvement the following is a specification.

The object of our invention is to provide means for supporting a railroad vehicle upon its wheels and axles, which shall embody the advantages, among others, of affording maximum safety in operation; ease of inspection and maintenance; adequate clearance above the railroad superstructure for the application and adjustment of the several wheel, axle, brake, and other members; the combination of a maximum of strength and a minimum of weight; the maintenance of the axles in square or at right angles to the frame on which they are mounted and the track; and the capability of ready application and removal of wheels and axles, of using journal boxes of the M. C. B. standard, and of detachably securing the journal boxes to the frames which they support.

The improvement claimed is hereinafter fully set forth.

In the accompanying drawings: Figure 1 is a side view, partly in section, of a car truck, illustrating an application of our invention; Fig. 2, a half plan view of the same; Fig. 3, a view, the right hand half of which is a vertical transverse section, on the line $x$ $x$ of Fig. 1, and the left hand half, an end view, in elevation; Fig. 4, a horizontal section through a journal box and its pivoted connecting arm, in the plane of the axle; Fig. 5, a vertical transverse section through a side frame member and longitudinal central section through a journal box; Fig. 6, a view, showing a structural modification, the right hand half being a plan view, partly in horizontal section on the line $y$ $y$ of Fig. 7, and the left hand half, a top plan view; Fig. 7, a view, the right hand half of which is partly in vertical central section and partly in vertical section through the middle transverse plane of a journal box, and the left hand half, a side elevation; Fig. 8, a partial longitudinal section in the middle transverse plane of a journal box, showing a different disposition of springs; Fig. 9, a vertical section through the construction of Fig. 8, in the plane of the axle; Fig. 10, a view similar to Fig. 5, showing a modification of detail; and Fig. 11, a side view, in elevation of a railroad car, illustrating the wheeled supports as rigidly connected to the car frame.

Referring first to Figs. 1 to 5 inclusive, our invention is illustrated as applied in a four wheeled car truck, the frame of which is composed of two side members, 1, which, in this instance, are shown as integral castings of hollow or tubular section, each having a horizontal spring bearing, $1^b$, formed on its top, at each of its ends, and a transom, 2, by which the side members are rigidly connected, in and adjoining the middle transverse plane of the truck. The transom is supported at the sides of each of its ends, which are preferably, as shown, made of greater width than that of the remainder of its length, on pairs of horizontal bearing faces, $1^c$, formed on the tops of the side members, the members of each pair of bearing faces being spaced at a proper distance apart to receive abutting faces on the bottom of the transom. As shown in Figs. 1 to 3 inclusive, the transom is held against lateral movement relatively to the side frame members, 1, 1, by downwardly projecting tenons, $2^a$, which fit in corresponding recesses or sockets in the tops of the side frame members, and by downwardly projecting lips, $2^b$, formed centrally on its ends and extending over the adjoining portions of the side frame members. Relative lateral movement of the transom and side frame members is prevented, and a limited degree of relative vertical movement permitted, to allow of torsional movement of the side frames under abnormal track conditions, and vertical detachment of the transom from the side frames is positively prevented by pins, 2$^d$, passing through lugs on the bottom of the transom and held detachably in position by keys, 2$^e$.

It will be seen that by the above construction, the connection of the transoms to the side frames is effected in a simple and thoroughly substantial manner, and at points which are at the maximum distance apart longitudinally upon the side members. The advantage of the latter feature, in maintaining the normal squareness of the truck frame will be apparent to those who are familiar with the operation of railroad rolling stock.

The truck wheels, 3, are secured, in the usual manner, on axles, 3$^a$, the journals, 3$^b$, of which, rotate under bearings, 4$^a$, fitted in journal boxes, 4, each of which is adapted to move vertically, but not laterally or longitudinally, relatively to the frame, by the following means. Each of the journal boxes, 4, is formed integral with, or rigidly connected to, (the latter construction being shown in Figs. 1 to 7 inclusive), an arm 4$^c$, which is pivotally connected to the side frame supported by the journal box, by a pin, 4$^d$, passing through the inner end of the arm and through a long bearing or bearings on the side frame member. As shown in Fig. 1, the arms, 4, are forked, their upper and lower members fitting against the top and bottom of the journal box, respectively, and they are secured thereto by vertical bolts or rivets, 4$^b$, located on opposite sides of the journal box. The degree of relative movement of the side frame members and the journal box arms and journal boxes, is limited by links, 4$^e$, fitted in perforations in the ends of the side frame members, and engaging projections on the ends of the upper members of the journal box arms. The truck frame is supported on the journal boxes, through the intermediation of helical springs, 5, a nest or plurality of which, disposed symmetrically with the central plane of the adjacent axle and journal box, is interposed between each of the spring bearings, 1$^b$, of the side frame members, and an equalizing plate, 6, which is provided with lateral lips or flanges engaging the upper member of the adjacent journal box arm, 4$^c$, on which it bears centrally, and which fits, with the capacity of free relative vertical movement, between the vertical webs of the adjacent side frame member, 1, as clearly shown in Fig. 5. The equalizing plates provide, on their upper surfaces, lower bearings for the springs, 5, and by their engagement with the journal box arms, and fit within the side frame members, prevent lateral movement of the journal boxes and axles relatively to the frame. A special feature of advantage of our invention, results from the construction above described, by which the lateral thrust incident to the operation of the vehicle is fully provided for and taken up at the journal boxes and side frame members.

In the structural modification shown in Figs. 8 and 9, the journal box arm, 4$^c$, is cast integral with the journal box, 4, and the springs, 5, are located on opposite sides of the journal box, instead of on top of it as in the former case, and are interposed between bearing faces on the arm, 4$^c$, and the equalizer, 6, which, in this instance, is located above them, and is coupled to the adjacent side frame member, 1, by a pin, 6$^a$. Fig. 10 shows another structural modification, in which the springs, 5, abut, at top, on the spring bearings, 1$^b$, of the side members, and, at bottom, on a lower bearing plate, 6$^b$, having inclined faces which bear on rollers, 6$^c$, resting on a plate, 6$^d$, having oppositely inclined faces and connected to the top of the journal box, 4. The object of this latter construction is to enable a limited amount of lateral movement, relatively to the truck frame, to be allowed the journal boxes, the pivot pins of the arms, 4$^c$, of which, being suitably fitted in the side frame members to accommodate such lateral movement.

The embodiment of our invention illustrated in Figs. 6 and 7, accords in its essential features, with that first above described, and differs structurally therefrom, as to the form of the transom and of the pivot bearing ends of the journal box arms, and in the addition of a lateral motion bolster. The transom, 2, is, in this instance, shown as a rolled metal plate, of U or channel section, which is secured, at its ends, to the side frame members, 1, by rivets, 2$^f$, and the journal box arms, 4$^c$, are forked both vertically and horizontally, and fit on opposite sides of each of the side frame members, 1, to which they are coupled by pivot pins, 4$^d$, as before. A bolster, 8, of substantially U or channel section, having lateral recesses at its ends, engaging vertical bolster guides on the side frame members, is supported thereon, with the capacity of relative vertical, but not longitudinal, movement, by springs, 9, and an inner or supplemental bolster, 8$^a$, is fitted, with the capacity of relative longitudinal movement within the main bolster, 8. The supplemental bolster may be supported on the main bolster by rockers or any other suitable known form of lateral motion appliances, which do not form part of our present invention and are not therefore herein particularized.

Our invention, while particularly designed to provide a wheeled support for a railroad vehicle in which a swiveling truck frame is interposed between the supporting means and the vehicle, as in the exemplifications hereinbefore described, is not limited to such specific form of application, and may, without variation of structural or operative principle, be applied directly to the frame of the vehicle, as shown in Fig. 11, which illustrates a four wheeled freight car which is not provided with a swiveling truck. The journal boxes, 4, are, in this instance, as in those previously described, pivotally connected, by arms, 4ᶜ, to a frame supporting a railroad vehicle, which in this case, is the ordinary underframe, 9, of the car body, 10. The pivot pins, 4ᵈ, of the journal box arms, are seated in brackets, 9ᵃ, secured to, and projecting downwardly from, the side sills of the frame, and the latter is, as before, supported by springs interposed between the tops of the journal box arms and the frame. The journal box at the right is shown as provided with helical springs, 5, and that at the left, with a plate spring, 5ᵃ, either of these forms being adaptable, in the discretion of the constructor.

We claim as our invention and desire to secure by Letters Patent:

1. In a railroad vehicle, the combination of a frame, two wheeled axles, journal boxes supported on said axles, arms fixed to said journal boxes and pivotally connected to the frame, means, connected with the journal boxes, for effecting their lateral engagement with the frame, while permitting relative vertical movement, and thereby transmitting lateral thrust between the journal boxes and the frame independently of the pivots of the journal box arms, and means for yieldingly supporting the frame on the journal boxes.

2. In a railroad vehicle, the combination of a frame, two wheeled axles, journal boxes supported on said axles, arms fixed to said journal boxes and pivotally connected to the frame, means for permitting relative vertical movement of the journal boxes and frame and transmitting lateral thrust between the journal boxes and the frame, and springs interposed between the journal box arms and the frame and disposed symmetrically relatively to the central planes of the journal boxes.

3. In a railroad vehicle, the combination of a frame, two wheeled axles, journal boxes supported on said axles, arms fixed to said journal boxes and pivotally connected to the frame, equalizing plates connected with the journal boxes and engaging laterally but not vertically with the frame, thereby transferring lateral thrust of the journal boxes to the frame independently of the pivots of the journal box arms, and springs interposed between said equalizing plates and the frame.

4. In a railroad vehicle, the combination of a frame, two wheeled axles, journal boxes supported on said axles, arms fixed to said journal boxes and pivotally connected to the frame, equalizing plates connected with the journal boxes and engaging laterally but not vertically with the frame, thereby transferring lateral thrust of the journal boxes to the frame independently of the pivots of the journal box arms, and springs interposed between the equalizing plates and the frame and disposed symmetrically relatively to the central planes of the journal boxes.

5. In a railroad vehicle, the combination of a frame comprising two side members and a transverse connecting member, two wheeled axles, journal boxes supported on said axles, arms fixed to said journal boxes and pivotally connected to the side frame members, equalizing plates connected with the journal boxes and engaging laterally with the side frame members, thereby transferring lateral thrust of the journal boxes to the side frame members independently of the pivots of the journal box arms, and springs interposed between said equalizing plates and the side frame members.

6. In a railroad vehicle, the combination of a frame comprising two side members and a transverse connecting member, two wheeled axles, journal boxes supported on said axles, arms fixed to said journal boxes and pivotally connected to the side frame members, means for engaging said arms laterally but not vertically with the side frame members, means for limiting the range of relative vertical movement of the side frame members and journal box arms, and means for yieldingly supporting the side frame members on said arms.

7. In a railroad vehicle, the combination of a frame comprising two side members and a transverse connecting member, two wheeled axles, journal boxes supported on said axles, arms fixed to said journal boxes and pivotally connected to the side frame members, means for engaging said arms laterally but not vertically with the side frame members, and springs interposed between said arms and the side frame members and disposed symmetrically relatively to the central planes of the journal boxes.

8. In a railroad vehicle, the combination of a frame comprising two side members and a transverse connecting member, two wheeled axles, journal boxes supported on said axles, arms having forks fitting above and below the journal boxes, pivot pins detachably connecting said arms to the side frame members, bolts passing through the forks of said arms on opposite sides of the journal boxes and detachably connecting the journal boxes to said arms, and springs interposed between the upper forks of said arms and the side frame members.

9. In a railroad vehicle, the combination of a frame comprising two side members and a transverse connecting member, two wheeled axles, journal boxes supported on said axles, forked arms pivotally connected to the side frame members and fitting above and below the journal boxes, bolts passing through the forks of said arms on opposite sides of the journal boxes and detachably connecting the journal boxes to said arms, equalizing plates engaging the upper forks of the journal box arms, and engaging the side frame members laterally but not vertically, and springs interposed between said equalizing plates and the side frame members.

JOHN E. MUHLFELD.
HERMAN F. BALL.

Witnesses:
 JAMES McLAUGHLIN,
 H. F. McDEVITT.